(12) United States Patent
Munn

(10) Patent No.: US 8,241,040 B2
(45) Date of Patent: Aug. 14, 2012

(54) TACTILE IDENTIFICATION SYSTEM FOR VISUALLY IMPAIRED

(75) Inventor: Roderick W. Munn, Bay Village, OH (US)

(73) Assignee: ECM International Group, Inc., Westlake, OH (US)

( * ) Notice: Subject to any disclaimer, the term of this patent is extended or adjusted under 35 U.S.C. 154(b) by 524 days.

(21) Appl. No.: 12/493,832

(22) Filed: Jun. 29, 2009

(65) Prior Publication Data

US 2010/0330540 A1 Dec. 30, 2010

(51) Int. Cl.
*G09B 21/00* (2006.01)

(52) U.S. Cl. ...................................................... 434/113

(58) Field of Classification Search .......... 434/112–117, 434/156, 157, 159; 283/36, 37, 41, 117; 400/109, 109.1; D18/19, 24, 26
See application file for complete search history.

(56) References Cited

U.S. PATENT DOCUMENTS

| | | | | |
|---|---|---|---|---|
| 3,363,339 A * | 1/1968 | Place | ............................ | 434/113 |
| 4,404,764 A * | 9/1983 | Wills et al. | ................. | 40/124.11 |
| 4,737,108 A * | 4/1988 | Chepaitis | ...................... | 434/113 |
| 4,802,855 A * | 2/1989 | Wood | ............................. | 434/157 |
| 4,832,374 A * | 5/1989 | Prest, Jr. | .......................... | 283/38 |
| 4,878,844 A * | 11/1989 | Gasper et al. | .................. | 434/159 |
| 4,973,086 A * | 11/1990 | Donnelly et al. | ................ | 283/37 |
| 5,286,204 A * | 2/1994 | Minardi | ........................ | 434/113 |
| 5,547,226 A * | 8/1996 | Wentworth | ..................... | 283/36 |
| 5,921,582 A * | 7/1999 | Gusack | ........................... | 283/67 |
| 6,013,154 A * | 1/2000 | Thomas-Cote | .............. | 156/277 |
| 6,227,371 B1 * | 5/2001 | Song | ............................. | 206/534 |
| 6,244,628 B1 * | 6/2001 | Muller | ............................ | 283/38 |
| D455,776 S * | 4/2002 | Gardner | ........................ | D18/24 |
| 8,021,157 B2 * | 9/2011 | Goren | ............................. | 434/114 |
| 8,024,882 B2 * | 9/2011 | Kelley | ............................. | 40/641 |
| 2002/0127047 A1 * | 9/2002 | Pollman et al. | ................. | 402/79 |

* cited by examiner

*Primary Examiner* — Kurt Fernstrom
(74) *Attorney, Agent, or Firm* — Birch, Stewart, Kolasch & Birch, LLP

(57) ABSTRACT

A tactile identification and classification system including a tab having an adhesive layer, a first field on the tab having at least one first projection, in which the first field defines a main category of items. Also included is a second field on the tab having at least one second projection. Further, the at least one second projection differs from the at least one first projection in shape or size, and the second field defines a sub category of items corresponding to the main category of items.

9 Claims, 5 Drawing Sheets

CLASSIFYING BATHROOM OBJECTS THAT ARE IN IDENTICAL BOTTLES

SHAMPOO  [ O ]

CONDITIONER  [ OO ]

HAIR RINSE  [ OOO ]

CLASSIFYING A VARIETY OF CANNED FOODS THAT ARE IDENTICALLY CANNED

PEAS  [ O ]

CORN  [ OO ]

BEANS  [ OOO ]

TOMATOES  [ OOOO ]

CLASSIFYING DIFFERENT TYPES OF THE SAME CANNED FOOD ITEM

TOMATOES  [ OOOO / OOOO ]

*DICED TOMATOES*  [ OOOO / O ]

*STEWED TOMATOES*  [ OOOO / OO ]

*WHOLE TOMATOES*  [ OOOO / OOO ]

*TOMATO SAUCE*  [ OOOO / OOOO ]

TACTILE IDENTIFICATION SYSTEM FOR VISUALLY IMPAIRED

FIELD OF THE INVENTION

The invention relates to a tactile identification and classification system.

BACKGROUND OF THE INVENTION

People having diminished visual capabilities rely upon other senses to obtain information and accomplish daily tasks. The sense of touch often substitutes for sight to convey information to those not able to rely upon sight. Braille is a well known tactile identification and classification system. Using the Braille letters, any word can be formed and sensed by touch. However, learning Braille requires a good deal of time, patience and desire. As such, Braille is usually used by persons blind from birth and a challenging option for those whose vision diminishes later in life.

Many devices are made to accommodate persons with impaired vision. However, these devices are usually oversized and expensive electronic devices. These devices also have the drawback that they perform a specific task. The lack of flexibility for the user requires that the user utilize many of these devices for each particular task to be accomplished.

SUMMARY OF THE INVENTION

Accordingly, one object of the present invention is to address the above-noted and other problems.

Another object of the present invention is to provide a novel tactile identification and classification system that is easy to learn and implement.

Still another object of the present invention is to provide a novel tactile identification and classification system that uses projections in various patterns to which the user can supply meaning.

To achieve these and other advantages and in accordance with the purpose of the present invention, as embodied and broadly described herein, the present invention provides in one aspect a tactile identification and classification system including a tab having an adhesive layer, a first field on the tab having at least one first projection, said first field defining a main category of items, and a second field on the tab having at least one second projection, the at least one second projection differing from the at least one first projection in shape or size, said second field defining a sub category of items corresponding to the main category of items.

In another aspect, the present invention provides a tactile identification and classification system including a plurality of tabs, each tab having a first field and a second field, the first field having from one to a plurality of projections, the number of projections designating a category; the second field having from none to a plurality of projections, the number of projections designating a subcategory of the category designated in the first field, and the projections in the second field being different than the projections in the first field in size or shape.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 4 is an overview of tabs for classifying different items according to an embodiment of the present invention;

DETAILED DESCRIPTION OF THE INVENTION

Reference will now be made in detail to the preferred embodiments of the present invention, examples of which are illustrated in the accompanying drawings.

Figure 1:
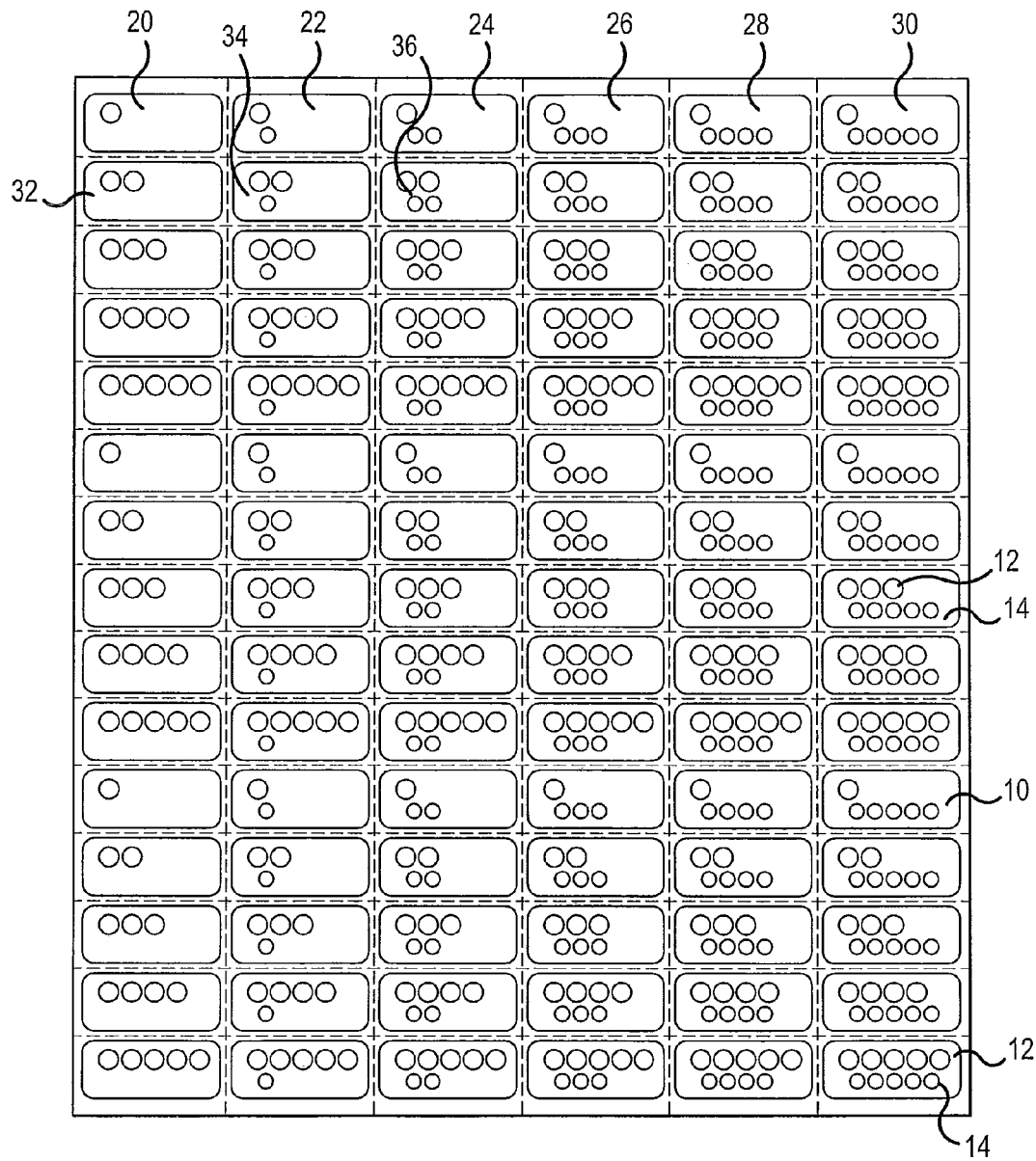
FIG. 1 is a plan view of a tab having projections used by a tactile identification and classification system according to an embodiment of the present invention.

Used individually or in combination, a sheet of tabs having the tactile identification and classification system according to an embodiment of the invention is depicted in FIG. 1. The tab 10 may be made of any suitable material and any size. Examples of materials which can be used with the invention include plastic and fabric. A preferred size for a tab is 1.25 inches wide by 0.50 inches wide. This size allows six rows and fifteen rows of tabs to be fabricated from a single 8.5×11" sheet of material, as seen in FIG. 1. Sheets of plastic having an adhesive layer and a backing sheet can be used to economically make the tabs.

In addition, as shown in FIG. 1, each tab has a first field having a primary identifier 12 to designate a category and a possible second field having a secondary identifier 14 to designate a subcategory. The two identifiers 12 and 14 are spatially separated from one another to increase the ease in differentiating the two from one another. In FIG. 1, the primary identifier 12 forms a top row while the secondary identifier 14 forms a bottom row. These relationships may be reversed with the primary identifier 12 forming the bottom row and the secondary identifier 14 forming the top row. The primary and secondary identifiers 12 and 14 may also be formed in columns. The columns of identifiers may be vertical columns or diagonal columns (e.g., where an upper right half corner of the tab includes a diagonal column of primary identifiers 12 and a lower left half corner of the tab include a diagonal column of the secondary identifiers 14). The first and second fields respectively including the primary and secondary identifiers 12 and 14 may also be spatially spaced from each other by being on different halves of the tab.

Figure 2:
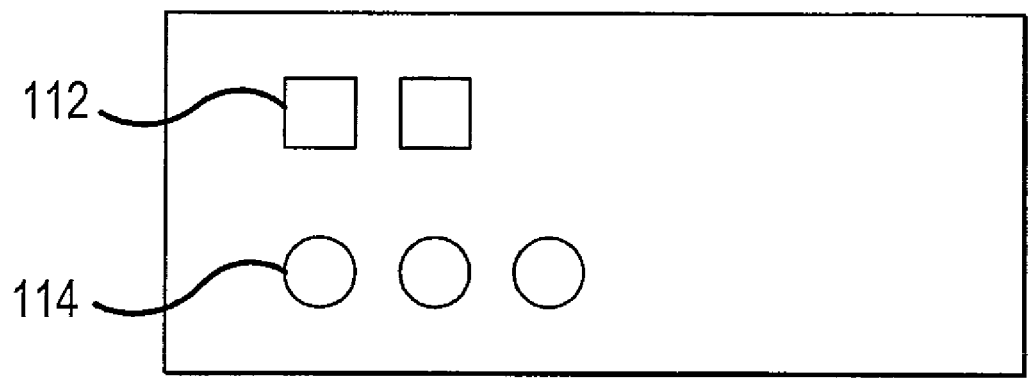
FIG. 2 is a plan view of a tab having an alternative system of projections according to an embodiment of the present invention.

The primary identifier 12 has a different tactile feel than the secondary identifier 14, as can be seen in FIG. 1 where the primary identifier 12 has a larger size than the secondary identifier 14. However, it is possible for the primary identifier 12 to have a different shape than the secondary identifier 14, such as shown in FIG. 2 where the primary identifier 112 is square and the secondary identifier 114 is round. The projections of the primary identifier 112 have the same size or shape as each other and are aligned with one another for ease of identification by touch. While the projections of the secondary identifier 114 also have the same size or shape as each other, and are aligned with each other, they have a different size or shape than the primary identifier 112 to differentiate them from the primary identifiers 112. It is possible for the projections of the secondary identifier 114 to have both a different size and shape than the projections of the primary identifier 112.

In addition, the user is free to determine the significance of the number of projections. The tactile identification and classification system can also be applied to a wide range of applications. One such example is in a filing system when the tabs are affixed to folders. As an example with respect to FIG. 3, the primary identifier 12 can be used to designate insurance with a single projection. Then the secondary identifier 14 can be used for the particular type of insurance, with a single projection 14 used to designate home insurance, two projections 14 designating auto insurance and three projections 14 designating health insurance. Similar comments apply to the main categories Receipts, Taxes, Medical and Income, and the corresponding secondary categories as shown in FIG. 3.

Figure 3:
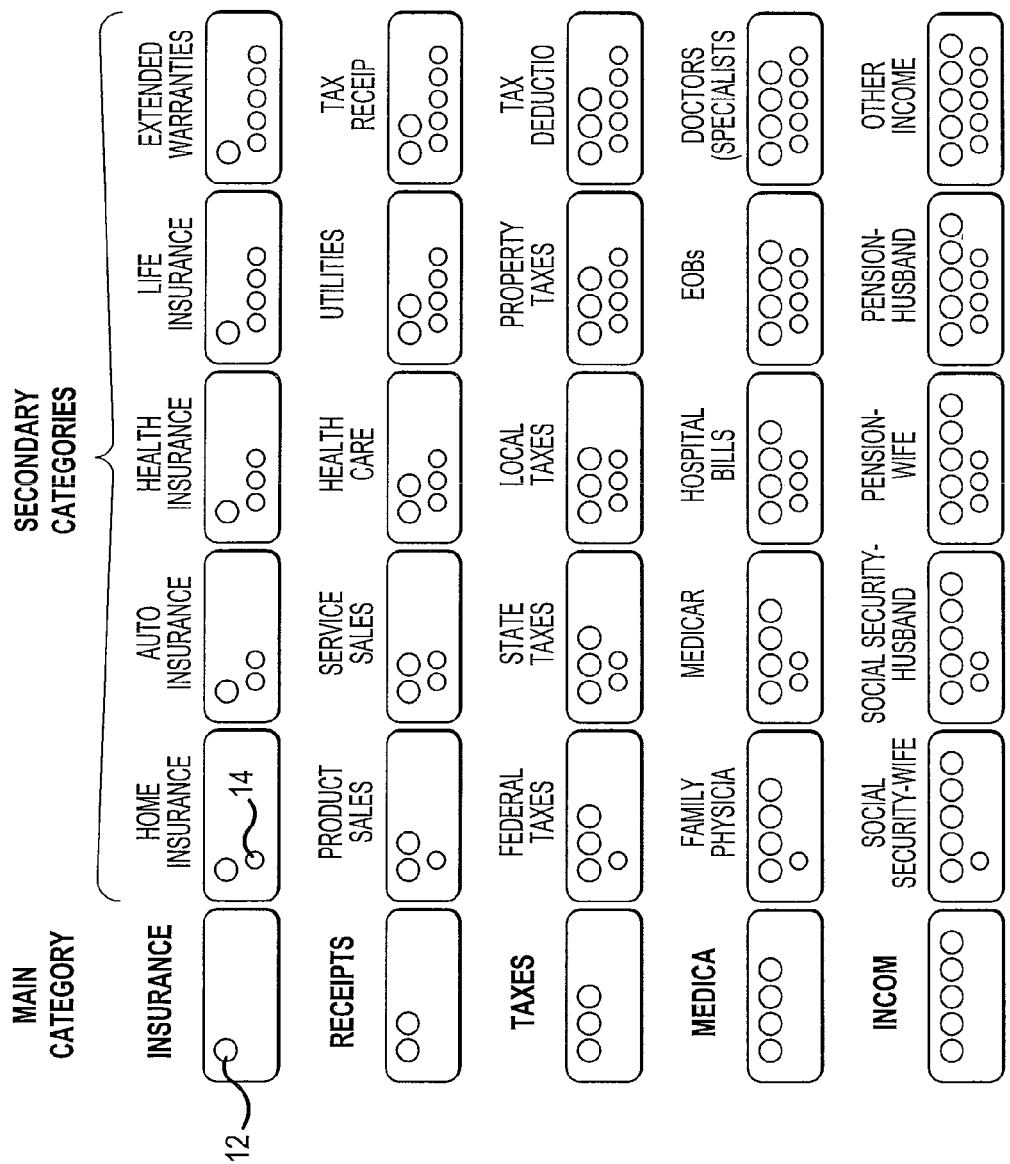
FIG. 3 is an overview of tabs for defining main categories and second categories according to an embodiment of the present invention.

Thus, a visually impaired person can feel the primary identifier 12 and recognize the projection is a primary identifier 12 because it is on the first field (top row of each tab in FIGS. 1 and 3) and because the projection is larger than the projection(s) for a secondary identifier 14 (bottom row of each tab in FIGS. 1 and 3). The user then knows that the first tab he or she has felt includes a single primary identifier 12 and that this represents a major category (e.g., insurance). The shape, size, etc. can also be set to assist the user in determining the meaning of the primary identifier 12. For example, a primary identifier 12 can be formed into a shape of a dollar bill to assist the user in determining that the primary identifier 12 represents bills or insurance bills in particular. The primary identifier 12 can also be formed in the shape of the letter "i" to indicate insurance. A combination of the letter "i" and the dollar sign "$" can also be used to designate a particular meaning to the primary identifier 12 such as insurance bills.

In addition, the user can determine that the first tab 20 in FIG. 1 is for insurance bills (i.e., a single primary identifier 12 is designated as bills). The user can also determine that the second tab 22 is for car insurance bills, the third tab 24 is for home insurance bills, the fourth tab 26 is for fire insurance bills, the fifth tab 28 is for medical insurance bills, and the sixth tab 30 is for life insurance bills.

Similarly, the user can determine the second row of tabs in FIG. 1 are for loans, for example (i.e., the user has designated or knows the two primary identifiers 12 in the tab 32 represent loan bills or related information). Thus, in this example, the user can determine the first tab 32 in the second row is for loans (the tab will be placed on the appropriate cabinet drawer, folder etc.), the second tab 34 in the second row (which can be placed on a folder within the cabinet drawer for loans) is for car loans, the third tab 36 in the second row is for student loans, etc. Therefore, according to embodiments of the present invention, the visually impaired person is able to become much more independent.

In addition, the primary identifier 12 can have the simple bubble shape shown in FIG. 1, and the same shape can be used for all primary identifiers 12. In more detail, the user may know that folders in the folder cabinet relate to bills. Thus, in this instance, a single primary identifier 12 can represent to the user bills related to insurance, a tab including two primary identifiers 12 can represent to the user bills related to credit cards, and three primary identifiers 12 can represent to the user bills related to health care. Thus, each primary identifier 12 can have the same shape (but differ in number) and the user can readily determine the meaning of the primary identifier 12.

Similarly, if the tabs are attached to canned foods stored in the user's cabinet, the user is generally going to know by the shape of the can, etc. that the primary identifiers 12 relate to canned foods. In this example, a single primary identifier 12 may indicate cat food and two primary identifiers 12 may represent dog food. The secondary identifiers 14 may be used to distinguish between different types or brands of dog and cat food. Further, the user can freely determine whether they prefer to have the primary identifiers 12 with a specific shape or to have primary identifiers 12 with a same shape. The same concept applies to the shapes of the secondary identifiers 14. For example, in an environment where there are many items placed that have similar shapes and are difficult to distinguish between without seeing them (e.g., cereal boxes, boxes containing spaghetti, etc.), the user may prefer to define the primary identifiers 12 to have a specific shape that is different for each set of articles or items.

For example, the user may prefer that cereal boxes include a primary identifier that is in the shape of a capital C (for Cereal). The secondary identifiers 14 are then used to distinguish between different types of cereals. That is, one second identifier 14 may be used to designate Frosted Flakes, two secondary identifiers 14 may be used to designate Lucky Charms, and three secondary identifiers 14 may be used to designate Fruit Loops. The secondary identifiers 14 may also be designated to have different shapes. For example, the secondary identifier 14 for Frosted Flakes may have the shape of a flake, the two secondary identifiers 14 for Lucky Charms may have the shape of a four leaf clover or other lucky charm, etc.

Thus, again with reference to FIG. 1, assume the tabs are to be applied to cereal boxes as described above, and that the cereal boxes are mixed together with other non-cereal boxes in a cabinet of a visually impaired person. In this instance, after negotiating their way to the kitchen, in the related art, the person will also have had much difficulty in finding the type of cereal they desired. That is, the person would either have to rely on the position of boxes, a relative or friend to choose the cereal desired, or have to individually smell or taste each cereal until they found the one desired. However, according to an embodiment of the present invention, the visually impaired person can easily determine the type of cereal by feeling or touching the created tabs as discussed above. In more detail, FIG. 4 is an overview of tabs for classifying different items according to an embodiment of the present invention. As shown in FIG. 4, the tabs can be used to classify bathroom objects that are in identical bottles, canned foods that are identically canned and different types of the same canned food items.

Further, the tactile identification and classification system according to embodiments of the present invention is particularly advantageous for institutions that require a large volume of tabs with unique or custom embodiments. For example, one embodiment of the present invention can be embodied on a computer readable medium. The institution can then load the disk (or download the software program via the Internet) onto a computer readable medium included in a desktop computer, for example. The program then allows the user to select a variety of shapes and sizes for the primary identifiers 12 and secondary identifiers 14.

Figure 5:
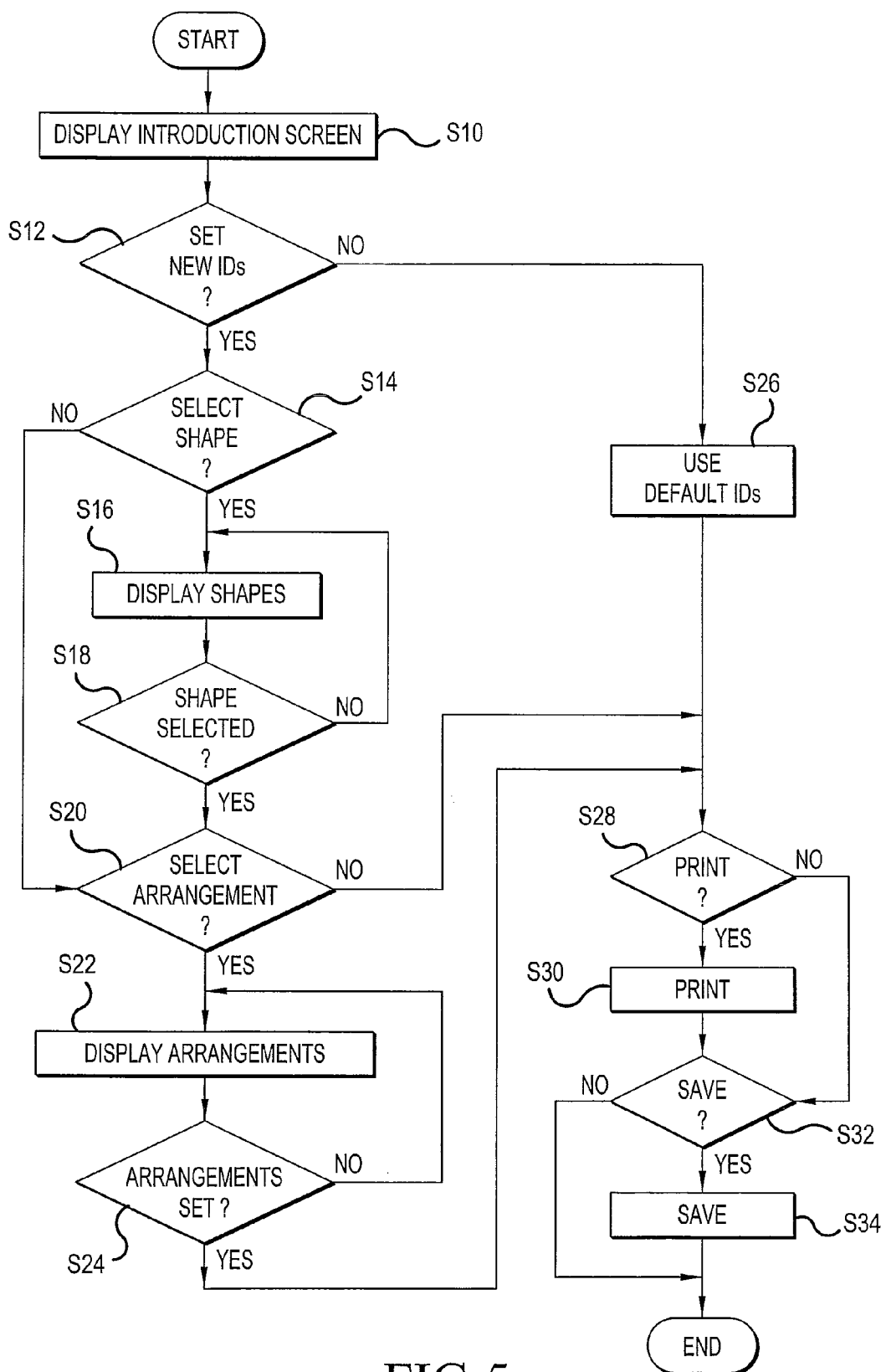
FIG. 5 is a flowchart illustrating a method of creating tabs included in the tactile identification and classification system according to an embodiment of the present invention.

In more detail, and with reference to FIG. 5, once the computer disk has been loaded into the computer or the appropriate software program has been downloaded from the Internet, the user is prompted with the initial display screen (S10). The initial display screen prompts the user to determine if they want to set identifiers or to use default identifiers (S12). When the user selects to set new identifiers (Yes in S12), the program asks the user if they want to select a particular shape or use a default shape (S14). Should the user select a specific shape (Yes in S14), the program displays a list of shapes that the user may select (e.g., a dollar sign shape, squares, circles, avatars, icons and a variety of other shapes) (S16). In addition, if the user wants shapes that are not displayed, the user can download additional shapes.

Then, the program determines if the user has selected a particular shape (S18). When the user has selected a particular shape (Yes in S18), the program prompts the user to determine if they would also like to select a particular arrangement (e.g., column arrangement, row arrangement, diagonal arrangement, etc.) (S20). When the user selects to set a particular arrangement (Yes in S20), the program displays the possible arrangements (S22). Then, when the user selects a particular arrangement (Yes in S24), the program prompts the user to determine if they want to create a design specification (S28).

The program can also display the created tabs before actually printing the design specification. Once the design specifications are created, the specifications can be printed and mailed or uploaded to Longboat Bay Products to have the labels manufactured. Then, if the user selects to print the created design specification (Yes in S28), the program prints the design specification (S30), and prompts the user to determine if they want to save the created specification (S32). If the user wants to save the created design specification (Yes in S32), the program saves the created specification (S34) such that the user can later print additional specifications as required. Also, if the user does not want to create a new shape or arrangement for the identifiers (No in S12 and S20), the program moves to step S28. In addition, the above steps described in FIG. 3 can be arranged differently or excluded as desired.

Thus, according to the embodiments of the present invention, institutions requiring large volume of tabs with unique embodiments can individually tailor tabs according to their own preferences. Such institutions can also create and print design specifications of the tabs using their standard computers and printers. Of course, the user can also purchase predetermined non-custom tabs at a store, via the Internet, etc.

In addition, the embodiments of the present invention can also be applied to larger scale systems. For example, a city may use larger size tabs to designate particular categories. For example, the city or other related department may use tabs to designate fire extinguishers in hotels (type A, B, C, etc.), to designate fire escapes or other escape routes, to designate elevator entrances, to designate particular floors on the elevator, to designate cross-walks and non-cross walks, etc. For example, the classification system may be used to designate a cross walk (single primary identifier 12), a long cross walk (single primary identifier 12 with two secondary identifiers 14), a short cross walk (single primary identifier 12 with three secondary identifiers 14), etc. Thus, the visually impaired individual can easily determine how fast they must cross the street, for example.

Also, once the primary identifier has been designated with at least one projection having a meaning, the secondary identifier can have no projections designated a meaning. A tab can be sized to fit any number of projections for an identifier. When the tab is made large enough to fit five projections for each of the primary and secondary identifiers, the system can produce thirty different combinations of primary and secondary identifiers when zero to five projections for the secondary identifier are used.

Thus, the embodiments of the present invention provide several advantages. For example, the system allows the user to assign any meaning to the series of projections making the system flexible and independent of language or cultural restraints. Also, the same user may use the system in multiple situations, such as in a filing cabinet system and to identify medications. The tactile identification and classification system of the invention also provides a system that is easy to learn and implement. The system uses projections in various patterns to which the user can supply meaning. A two tier system uses projections differing from one another in some manner such as size.

The system greatly simplifies the use of medicines. The primary and secondary identifiers can easily be used to distinguish prescription from non-prescription medications as well as specific drugs. For example, most prescription pill bottles are identical. Improperly identifying heart medicine from an antibiotic could have disastrous consequences. The problem is worse for over-the counter drugs. Over-the-counter drug bottles are often identical to bottles that not only do not contain helpful drugs, but may contain products that can be deadly if ingested. Such products include glues, solvents, polishes, and the like.

Also, in addition to an inability to distinguish objects or letters, the visually impaired is often unable to distinguish color. Using this system, it is a simply matter to represent basic colors through primary and secondary identifiers. In this way, visually impaired persons will be able to match clothing or arrange objects in ways that are pleasing to persons with vision. Further, the present invention is also a significant improvement over Braille. In more detail, Braille is literally an 'alphabet substitution'. There are almost as many Braille 'substitution alphabets' as there are languages. As a result Braille is language dependent—and must be learned. Further, the Braille alphabet has specific meaning and is therefore a 'closed' system and must be learned. On the contrary, the tactile and identification and classification system according to the embodiments discussed above are not predefined with projections having a specific meaning and is therefore an 'open' system that can be freely designated according to a user's own preference.

In addition, Braille is a tactile alphabet substitution with a defined structure that represents specific letters, numbers, or symbols. The fundamental use of Braille is to enable the visually impaired to read and write. However, devoid of a structure beyond each letter, number, or symbol, Braille is significantly limited in its ability to be used as a classification or categorization system. Further, to use Braille, an alphabet must be learned.

This is much different than the embodiments of the present invention as described above, which is an undefined tactile structure that can be instantly defined to represent an almost infinite variety of meanings. Therefore, the meaning of each tab is not limited by a predefined alphabet. Because the meaning of each tab within the system is provided by the user, there is nothing to learn. Meaning and applicability are instantaneous. Further, the system rests upon a classification and organizational scheme that allows combinations and permutations of tabs to symbolically create relationships between tabs. Such relationships allow organizational and classification capability beyond simple definition. The ease of use is evidenced by the ability for pre-school children to the elderly to instantly and accurately identify, classify, and retrieve objects. The below table illustrates some of the advantages of the present invention over the Braille system.

Advantages over Braille

| FEATURE/FUNCTIONALITY | BRAILLE ALPHABET SYSTEM | LONGBOAT BAY TACTILE IDENTIFICATION & CLASSIFICATION SYSTEM |
|---|---|---|
| Alphabet System | Yes | No |
| Must be Learned | Yes | No |
| Language Dependent | Yes | No |
| Culture Dependent | Yes | No |
| Identification System | No | Yes |
| Classification System | No | Yes |
| Instant Use | No | Yes |
| Rigid Structure | Yes | No |
| Malleable Structure | No | Yes |
| Open System | No | Yes |

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits whereby interconnecting an appropriate network of conventional computer circuits, as will be readily apparent to those skilled in the art.

Any portion of the present invention implemented on a general purpose digital computer or microprocessor includes a computer program product which is a storage medium including instructions which can be used to program a computer to perform a process of the invention. The storage medium can include, but is not limited to, any type of disk including floppy disk, optical disk, CD-ROMs, and magneto-optical disks, ROMs, RAMs, EPROMs, EEPROMs, magnetic or optical cards, or any type of media suitable for storing electronic instructions.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

I claim:

1. A tactile identification and classification system comprising:
   a tab having an adhesive layer;
   a first field on the tab having at least one first projection, said first field defining a main category of items; and
   a second field on the tab having at least one second projection, the at least one second projection having the same shape as the at least one first projection and differing from the at least one first projection in size, said second field defining a sub category of items corresponding to the main category of items.

2. The system of claim 1, wherein the at least one second projection is smaller than the at least one first projection.

3. The system of claim 1, wherein the at least one first projection includes a plurality of first projections aligned with one another in a first row.

4. The system of claim 3, wherein the at least one second projection includes a plurality of second projections aligned with one another in a second row vertically spaced from the first row of first projections.

5. The system of claim 1, wherein the at least one first projection and the at least one second projection are round.

6. A tactile identification and classification system, comprising:
   a plurality of tabs, each tab having a first field and a second field;
   the first field having from one to a plurality of projections, the number of projections designating a category;
   the second field having from none to a plurality of projections, the number of projections designating a subcategory of the category designated in the first field, the projections in the second field having the same shape as the at least one first projection and different than the projections in the first field in size.

7. The system of claim 6, wherein the at least one first projection and the at least one second projection are round.

8. The system of claim 6, further comprising:
   a plurality of first projections, the plurality of first projections aligned with one another in a first row.

9. The system of claim 8, further comprising:
   a plurality of second projections, the plurality of second projections aligned with one another in a second row.

* * * * *